Dec. 17, 1963 J. F. DUFFIELD 3,114,792

WIRING DEVICE ASSEMBLY

Filed July 1, 1960

Joseph F. Duffield
Inventor by: Donald F. Sim
Attorney

United States Patent Office 3,114,792
Patented Dec. 17, 1963

3,114,792
WIRING DEVICE ASSEMBLY

Joseph F. Duffield, Agincourt, Ontario, Canada, assignor to Amalgamated Electric Corporation, Limited, Toronto, Ontario, Canada Filed July 1, 1960, Ser. No. 40,239
13 Claims. (Cl. 174—54)

This invention relates generally to mounting means for wiring devices. In particular, this invention relates to an electrical assembly which is constructed so as to permit the use of a number of wiring devices with a conventional assembly receiving enclosure of the type which is adapted normally to receive a fewer number of conventional wiring devices. At the same time, the separate wiring devices and mounting straps making up the assembly are readily detachable therefrom, and the single wiring devices with their associated mounting straps may be employed singly in a conventional receiving enclosure.

While for purposes of simplification my invention will be described in connection with electrical switches, any other wiring devices such as push buttons, receptacles and pilot lights may be employed.

It is conventional practice in the electrical trades to attach a switch mounting strap carrying a switch to each switch enclosure box. If a double switch is required, a larger switch enclosure box is employed. Generally the larger switch enclosure box is made by knocking a side out of each of two single switch enclosure boxes, the sides thereof being of the knock-out type, and securing the two single boxes together with their open sides adjacent. In this manner standardization is achieved as only one size of switch enclosure box need be stocked. Single switches, each on mounting straps, are separately secured in each switch enclosure. I have found that volumetrically speaking a conventional switch enclosure having a conventional single switch and mounting strap secured thereto is inefficient because there is a large amount of waste space.

It is an object of this invention to provide an electrical assembly constructed so as to permit more than one wiring device mounting strap, each with their associated wiring devices, to be received by a conventional receiving enclosure of the type adapted to normally receive a fewer number of conventional mounting straps and their associated wiring devices.

It is another object of my invention to reduce the amount of time required to mount a number of wiring devices in an enclosure box.

It is a further object of my invention to eliminate the necessity of employing a conventional double wiring device enclosure in order to provide a double wiring device assembly.

It is another object of my invention to provide an electrical assembly comprising a number of wiring devices, each with associated mounting straps, detachably secured together in such a manner that one detached wiring device and mounting strap or the assembly thereof may be mounted in the same conventional wiring device receiving enclosure.

A further object of my invention is to provide an electrical assembly comprising a pair of wiring devices, each with associated mounting straps, detachably secured together in such a manner that one detached wiring device and mounting strap or the assembled pair may be mounted in the same conventional single wiring device receiving enclosure.

Another object of my invention is to provide an electrical assembly comprising three or four wiring devices, each with associated mounting straps, detachably secured together in such a manner that single detached wiring devices and mounting straps may be mounted one on each side of a conventional double wiring device receiving enclosure, or the assembly of three or four wiring devices may be mounted in the enclosure.

Other objects and advantages of my invention will become apparent from the ensuing disclosure taken in conjunction with the drawings in which.

In brief, an electrical assembly embodying my invention comprises at least a pair of mounting straps each having a conventional wiring device, such as a switch, for example, of the toggle type, mounted thereon. The wiring device mounting straps are secured side by side in aligned relationship with one another by means of a pair of clasp members detachably affixed to each of the mounting straps and positioned one above and one below the wiring devices. If there are two mounting straps and wiring devices, the assembly may be mounted in a conventional wiring device receiving enclosure of the type normally adapted to receive only one conventional strap and wiring device. Alternatively, only one strap and wiring device may be mounted in the enclosure box if desired. A conventional cover plate of insulating material may be placed over the straps and secured thereto.

Figure 1:
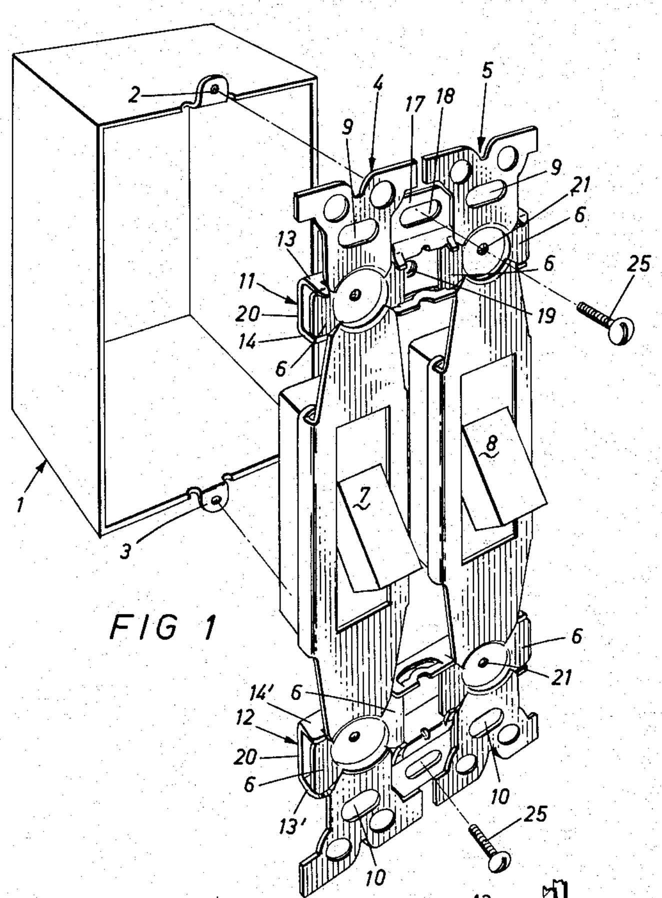
FIGURE 1 is a partially exploded perspective view of a switch assembly embodying my invention.

Referring now to the drawings for a more detailed description of an electrical assembly embodying my invention, I have shown a conventional single switch receiving enclosure 1 having only one pair of tabs 2 and 3, each of which is mounted on an opposite side of enclosure 1 for normally receiving only one conventional switch mounting strap, a conventional switch mounting strap being similar to the mounting straps 4 and 5 shown in FIGURE 1, except that conventional switch mounting straps are somewhat wider than the switch mounting straps 4 and 5 employed in practising my invention. In accordance with one embodiment of my invention, I employ a pair of switch mounting straps 4 and 5 having projections 6 thereon extending transverse to the mounting straps on both sides of the mounting straps and both above and below conventional switches 7 and 8. Switches 7 and 8 may be of the toggle type, and each is secured in insulated relationship with its respective switch mounting strap. Switches 7 and 8 are connected to wires (not shown) which extend into and out of conventional single switch receiving enclosure 1.

Figure 2:
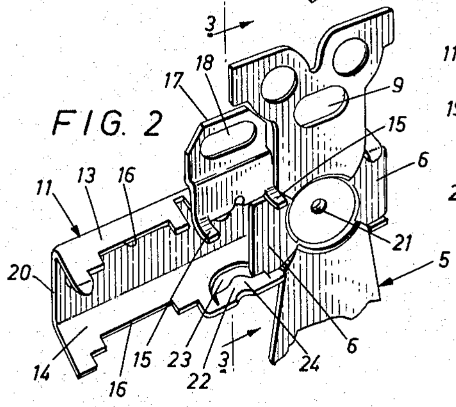
FIGURE 2 is a perspective view showing in greater detail a switch mounting strap and clasp which may be employed in practising my invention.
Figure 3:
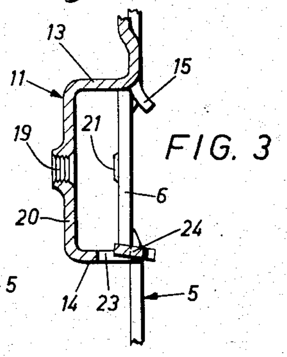
FIGURE 3 is a cross-sectional view taken on line 3—3 of FIGURE 2.

In order to permit a pair of switch mounting straps, each having a switch mounted thereon, to be received by conventional single switch receiving enclosure 1, I provide means such as a pair of U-shaped clasps 11 and 12, one of which is best seen in FIGURE 2. The upstanding arms 13 and 13′, of U-shaped clasps 11 and 12 respectively are provided with a plurality of tabs 15 projecting therefrom, tabs 15 being slightly inclined downwardly over projections 6. Recesses 16 are provided in upstanding arms 13, 14, and 13′, 14′ and are adapted to receive a portion of switch mounting straps 4 and 5 as shown. A latch mechanism 22 is provided in upstanding arms 14 and 14′ of the U-shaped clasp members. This latch mechanism is formed by punching an aperture 23 in arms 14 and 14′ and crimping portion 24 upwardly to form shoulders which abut against projections 6 and retain the mounting straps detachably secured to the clasps. In order to secure a clasp and mounting strap, for example mounting strap 5 and clasp 11, the top edges of projections 6 are placed under tabs 15 while strap 5 is held slightly inclined with respect to clasp 11. Strap 5 is then pivotally moved about the top edges of projections 6 until the lower edges of projections 6 are forced over portion 24 and projections 6 are in the position shown in FIGURE 2 behind the shoulders. Downward and inward pressure on portion 24 will permit the straps to be easily released from the shoulders and removed from clasp 11. As shown in FIGURE 1, clasps 11 and 12 are positioned both above and below switch mounting straps 4 and 5 and detachably hold switch mounting straps 4 and 5 side by side in aligned relationship, straps 4 and 5 and projections 6 all lying in the same plane. Clasps 11 and 12 are each provided with a tab 17 having an aperture 18 therein.

The assembly comprising clasps 11 and 12 and switch mounting straps 4 and 5 with their associated switches 7 and 8 respectively may be secured to conventional single switch receiving enclosure 1 by means such as a threaded fastener 25 passed through apertures 18 in tabs 17 and the apertures in tabs 2 and 3.

It will thus be seen that in accordance with my invention, two switch mounting straps, each having a switch associated therewith, may be received by a conventional single switch receiving enclosure which is adapted normally to receive only one conventional switch mounting strap with its associated switch.

Alternatively, either of switch mounting straps 4 and 5 may be secured to conventional single switch receiving enclosure 1 by means of threaded fasteners passed through apertures 9 and 10 and the apertures in tabs 2 and 3.

A special advantage of my invention is that mounting straps such as 4 and 5 may be sold along with clasps such as 11 and 12, and on the job the clasps may be employed to readily secure a pair of straps if a double switch is required, or the clasps may be saved if only a single switch is required.

A cover plate (not shown) may be positioned over the faces of switch mounting straps 4 and 5 remote from single switch receiving enclosure 1 by means of threaded fasteners passed through the cover plate and into threaded engagement with threaded apertures 19 provided in each cross-piece 20 of clasps 11 and 12. The cover plate may be suitably insulated from the switch mounting straps 4 and 5 and conventional single switch enclosure 1, and to this end may be made of a suitable insulator such as plastic.

As previously mentioned, if only a single switch assembly is desired, this may be achieved by positioning only one of the switch mounting straps 4 and 5 on the conventional single switch receiving enclosure by means of threaded fasteners passing through apertures 9 and 10 and the apertures in tabs 2 and 3. A cover plate may be mounted in insulated relationship on such a single switch mounting strap by means of threaded fasteners passed through the cover plate and into apertures 21 provided both above and below the switch associated with the switch mounting strap.

It will be seen to be an inherent advantage of my invention that only one size of switch receiving enclosure is required to mount either a single or a double switch. In addition, in order to practice my invention, it is not necessary to alter the size of the conventional single switch enclosures now available, nor is it necessary to alter the size of the switches now available.

It is important to note that where it is desirable to provide three or four switch mounting straps and associated switches in a conventional double switch receiving enclosure, such as may be formed by placing two enclosures 1 side by side, knocking out the dividing side walls and securing the enclosures together, this may be done by providing longer clasps with additional recesses 16 and latching mechanisms 23.

As previously noted, switches 7 and 8 could be other wiring devices such as receptacles, push buttons and pilot lights, and various combinations may be employed.

While I have disclosed preferred embodiments of my invention, other embodiments may be constructed by those skilled in the art without departing from the spirit and scope of my invention as defined in the appended claims. For example, while clasp members 11 and 12 perform the dual function of coupling the mounting straps together and holding them together so that the electrical assembly consisting of the coupling members, the mounting straps and the wiring devices can be assembled as a unit prior to installation on the enclosure, obviously it would not depart from my invention to employ coupling members which only serve to couple the mounting straps, and do not hold them together when the assembly is apart from the enclosure, but do hold the assembly together when it is installed on the enclosure by virtue of the engagement of the coupling members with the mounting straps and the affixing of the coupling members to the enclosure.

What I claim as my invention is:

1. In combination, an electrical assembly and a wiring device receiving enclosure having side walls defining an open end, said electrical assembly comprising at least two mounting straps, wiring devices, each of said mounting straps having a wiring device secured thereto, mounting strap mounting apertures passing through each of said mounting straps above and below said wiring devices, said mounting strap mounting apertures in each of said mounting straps and said wiring device secured to said mounting strap lying in at least substantially a straight line, and coupling members separate from said mounting straps, said mounting straps being detachably coupled side by side by said coupling members, each of said mounting straps being adapted to be directly mounted individually on said wiring device receiving enclosure by fastening means passed through said mounting strap mounting apertures, engaging said enclosure and securing said mounting strap to said enclosure, said enclosure being adapted to receive less than the number of said mounting straps in said assembly when said mounting straps are individually directly mounted on said enclosure at the open end thereof, the number of said mounting straps in said assembly being at least one greater than the number of said mounting straps which can be mounted individually and directly on said enclosure, said assembly being mounted on said enclosure at the open end thereof with said wiring devices positioned within the planes defined by said side walls of said enclosure.

2. The invention according to claim 1 wherein there are two mounting straps, and including a coupling member mounting aperture extending through each of said coupling members intermediate said mounting straps, said assembly being mounted on said enclosure at the open end thereof with said wiring devices positioned within the planes defined by said side walls of said enclosure by fastening means passed through said coupling member mounting apertures, engaging said enclosure and securing said assembly to said enclosure.

3. The invention according to claim 1 wherein there are two coupling members, one of said coupling members being positioned above said wiring devices, the other of said coupling members being positioned below said wiring devices.

4. The invention according to claim 2 wherein said enclosure is a conventional single mounting strap receiving enclosure of the type having only one pair of tabs mounted thereon for normally receiving only one wiring device mounting strap, said assembly being mounted on said enclosure by fastening means passed through said coupling member mounting apertures, engaging said tabs and securing said assembly to said enclosure, said mounting straps each being adapted to be directly mounted individually on said enclosure by fastening means passed through said mounting strap mounting apertures, engaging said tabs and securing said mounting strap to said enclosure.

5. An electrical assembly according to claim 4 wherein said wiring devices are switches.

6. The invention according to claim 4 wherein there are two coupling members, one of said coupling members being positioned above said wiring devices, the other of said coupling members being positioned below said wiring devices.

7. In combination, an electrical assembly and a wiring device receiving enclosure having side walls defining an open end, said electrical assembly comprising at least two mounting straps, wiring devices, each of said mounting straps having a wiring device secured thereto, mounting strap mounting apertures passing through each of said mounting straps above and below said wiring devices, said mounting strap mounting apertures in each of said mounting straps and said wiring device secured to said mounting strap lying in at least substantially a straight line, each of said mounting straps having projection means on each side of said wiring device and extending outwardly from said mounting straps, and clasp members separate from said mounting straps, said mounting straps being detachably secured side by side in aligned relationship by said clasp members, said clasp members being detachably secured to said projection means, each of said mounting straps being adapted to be directly mounted individually on said wiring device receiving enclosure by fastening means passed through said mounting strap mounting apertures, engaging said enclosure and securing said mounting strap to said enclosure, said enclosure being adapted to receive less than the number of said mounting straps in said assembly when said mounting straps are individually directly mounted on said enclosure at the open end thereof, the number of said mounting straps in said assembly being at least one greater than the number of said mounting straps which can be mounted individually and directly on said enclosure, said assembly being mounted on said enclosure at the open end thereof with said wiring devices positioned within the planes defined by said side walls of said enclosure.

8. The invention according to claim 7 wherein said projection means are provided on each side of said wiring device and above and below said wiring device, there are two clasp members, one of said clasp members being detachably secured to said projection means above said wiring devices, the other of said clasp members being detachably secured to said projection means below said wiring devices.

9. The invention according to claim 7 wherein there are two mounting straps and including a clasp member mounting aperture extending through each of said clasp members intermediate said mounting straps, said assembly being mounted on said enclosure at the open end thereof with said wiring devices positioned within the planes defined by said side walls of said enclosure by fastening means passed through said clasp member mounting apertures, engaging said enclosure and securing said assembly to said enclosure.

10. The invention according to claim 7 wherein there are two clasp members, one of said clasp members being positioned above said wiring devices and the other of said clasp members being positioned below said wiring devices, said clasp members are U-shaped, and including tabs projecting from one of the upstanding arms of said U-shaped members and extending over said projection means, and releasable latch means on the other arms of said U-shaped members, said latch means engaging said projection means when said clasp members are affixed to said projection means.

11. The invention according to claim 9 wherein said enclosure is a conventional single mounting strap receiving enclosure of the type having only one pair of tabs mounted thereon for normally receiving only one wiring device mounting strap, said assembly being mounted on said enclosure by fastening means passed through said clasp member mounting apertures, engaging said tabs and securing said assembly to said enclosure, said mounting straps each being adapted to be directly mounted individually on said enclosure by fastening means passed through said mounting strap mounting apertures, engaging said tabs and securing said mounting strap to said enclosure.

12. The invention according to claim 11 wherein there are two clasp members, one of said clasp members being positioned above said wiring devices and the other of said clasp members being positioned below said wiring devices, said clasp members are U-shaped, and including tabs projecting from one of the upstanding arms of said U-shaped members and extending over said projection means, and releasable latch means on the other arms of said U-shaped members, said latch means engaging said projection means when said clasp members are affixed to said projection means.

13. The invention according to claim 9 wherein there are two clasp members, one of said clasp members being positioned above said wiring devices, the other of said clasp members being positioned below said wiring devices.

References Cited in the file of this patent

UNITED STATES PATENTS

| | | |
|---|---|---|
| Re. 19,092 | Despard | Feb. 20, 1934 |
| 1,286,605 | Hallstrom | Dec. 3, 1918 |
| 1,909,270 | Guett | May 16, 1933 |
| 2,248,201 | Russell et al. | July 8, 1941 |
| 2,836,687 | Gelzheiser et al. | May 27, 1958 |
| 2,889,437 | Christensen | June 2, 1959 |

OTHER REFERENCES

Flier: P and S Despard Wiring Devices, Form 2456, Pass and Seymour, Inc., Syracuse 9, New York.